United States Patent
Akutsu

(10) Patent No.: US 7,092,028 B2
(45) Date of Patent: Aug. 15, 2006

(54) PROJECTING APPARATUS WITH SHOOTING FUNCTION, PROGRAM FOR CONTROLLING PROJECTING APPARATUS WITH SHOOTING FUNCTION, AND PROJECTION IMAGE SHOOTING SYSTEM

(75) Inventor: Takashi Akutsu, Akiruno (JP)

(73) Assignee: Casio Computer Co., Ltd, Tokyo (JP)

( * ) Notice: Subject to any disclaimer, the term of this patent is extended or adjusted under 35 U.S.C. 154(b) by 0 days.

(21) Appl. No.: 10/957,859

(22) Filed: Oct. 4, 2004

(65) Prior Publication Data
US 2005/0078203 A1 Apr. 14, 2005

(30) Foreign Application Priority Data
Oct. 10, 2003 (JP) ............................. 2003-351429

(51) Int. Cl.
*H04N 5/232* (2006.01)

(52) U.S. Cl. ..................... 348/345; 348/552

(58) Field of Classification Search ............. 348/345, 348/552
See application file for complete search history.

(56) References Cited

U.S. PATENT DOCUMENTS 5,027,219 A * 6/1991 Stuttler et al. ................ 348/96

2004/0130685 A1 * 7/2004 Wu ............................. 353/101

FOREIGN PATENT DOCUMENTS

| JP | 04-109235 | * 10/1992 |
| JP | 11-305335 | * 5/1999 |
| JP | 11-305335 A | 11/1999 |

* cited by examiner

*Primary Examiner*—Thai Tran
*Assistant Examiner*—Heather R. Jones
(74) *Attorney, Agent, or Firm*—Frishauf, Holtz, Goodman & Chick, PC

(57) ABSTRACT

After power is turned on, a control section causes a distance detecting section to detect a distance up to a screen, and controls focus positions of a projector lens and an imaging lens in synchronization with each other based on the detected distance (projection distance and subject distance) and an initialized zoom ratio. Moreover, when a change operation in angle of view is executed by a user in a user control apparatus, the control section changes a zoom ratio of the projector lens according to the user's operation and changes a zoom ratio of the imaging lens to correspond to the zoom ratio of the projector lens. The control section controls the zoom ratio and the focus position of the imaging lens in synchronization with setting of the zoom ratio and the focus position of the projector lens.

14 Claims, 8 Drawing Sheets

US 7,092,028 B2

PROJECTING APPARATUS WITH SHOOTING FUNCTION, PROGRAM FOR CONTROLLING PROJECTING APPARATUS WITH SHOOTING FUNCTION, AND PROJECTION IMAGE SHOOTING SYSTEM

BACKGROUND OF THE INVENTION

1. Field of the Invention

The present invention relates to a projecting apparatus with a shooting function of shooting a screen on which an image is projected in addition to a function of projecting an image onto the screen, program for controlling the projecting apparatus with a shooting function, and projection image shooting system.

2. Description of the Related Art

In recent years, documents (characters, diagram, etc.) that are stored as data in a personal computer are magnified and projected on a screen using a projector at the time of the presentation, the conference and the like. There is generally used the projector which includes a configuration wherein image information of the document input as an image signal from PC and the like is converted to a projection light by an image converting device such as a liquid crystal, a micromirror array and the like.

On the other hand, in using the projector at the conference and the like, a whiteboard is used as a screen and a character, a line (underline, ruled line), etc. are frequently added to a projected document. In this case the screen (whiteboard) is shot by a digital camera, so that the document on which the character and the like are written is converted to digital data (image data). Moreover, regarding an apparatus for converting the document on which the character and the like are written to digital data, Unexamined Japanese Patent Application KOKAI Publication No. H-11-305335 (patent document 1, see FIG. 1) describes a projector equipped with a digital camera. The projector equipped with the digital camera has two types of optical systems, namely, a projector lens for the projector and a taking lens for the digital camera. For this reason, an adjustment of an angle of view (zoom ratio) of the projection image and a focus adjustment in the projector, and an adjustment of an angle of view (zoom ratio) and a focus adjustment in the digital camera according to the former adjustments are indispensable at the time of using the projector, and this causes a problem in which a preparatory work for using is complicated.

SUMMARY OF THE INVENTION

A projecting apparatus with a shooting function according to a first aspect of the present invention includes a projecting section that projects a projection light representing an image onto a screen. The projecting apparatus further includes a camera section that shoots the screen on which the projection light is projected. The projecting apparatus further includes an image converting section that converts image information to a projection light. The projecting apparatus further includes a position adjustable projection optical section that projects the projection light converted by the image converting section onto the screen. The projecting apparatus further includes an imaging section that images an image represented by the projection light projected on the screen. The projecting apparatus further includes a position adjustable imaging optical section that image-forms an optical image imaged by the imaging section. The projecting apparatus further includes a control section that controls a position of the imaging optical section together with a position of the projection optical section.

A program according to a second aspect of the present invention is a program for controlling a computer possessed by a projecting apparatus with a shooting function which apparatus includes a projecting section that projects a projection light representing an image onto a screen, a camera section that shoots the screen on which the projection light is projected, a position adjustable projection optical section that is used to project the projection light, and a position adjustable imaging optical section that is used to shoot the image represented by the projection light projected on the screen. The program causes the computer to control a position of the imaging optical section together with a position of the projection optical section.

Moreover, a projection image shooting system according to a third aspect of the present invention includes an image projecting apparatus that projects a projection light representing an image onto a screen. The projection image shooting system further includes an imaging apparatus that images the screen on which the projection light is projected. The image projecting apparatus includes an image converting section that converts image information to a projection light. The image projecting apparatus further includes a position adjustable projection optical section that projects the projection light converted by the image converting section onto the screen. The image projecting apparatus further includes a transmitting section that transmits angle-of-view information indicating a zoom ratio of the projection optical section to the imaging apparatus. The imaging apparatus includes an imaging section that images an image represented by the projection light projected on the screen. The imaging apparatus further includes a position adjustable imaging optical section that image-forms an optical image imaged by the imaging section. The imaging apparatus further includes an imaging-side driving section that drives the imaging optical section. The imaging apparatus further includes a receiving section that receives the angle-of-view information transmitted from the image projecting apparatus. The imaging apparatus further includes a control section that causes the imaging-side driving section to drive the imaging optical section based on the angle-of-view information received by the receiving section, thereby controlling a zoom ratio of the imaging optical section to a zoom ratio corresponding to a zoom ratio of the projection optical section.

BRIEF DESCRIPTION OF THE DRAWINGS

These objects and other objects and advantages of the present invention will become more apparent upon reading of the following detailed description and the accompanying drawings in which:

FIG. 2 is a flowchart illustrating an operation of the projector shown in FIG. 1 after power is turned on;

FIG. 4 is a flowchart illustrating an operation of the projector shown in FIG. 3 after power is turned on;

FIG. 6 is a flowchart illustrating an operation of the projector shown in FIG. 5 after power is turned on;

DETAILED DESCRIPTION OF THE PREFERRED EMBODIMENTS

The following will explain embodiments of the present invention with reference to the drawings.

First Embodiment

Figure 1:
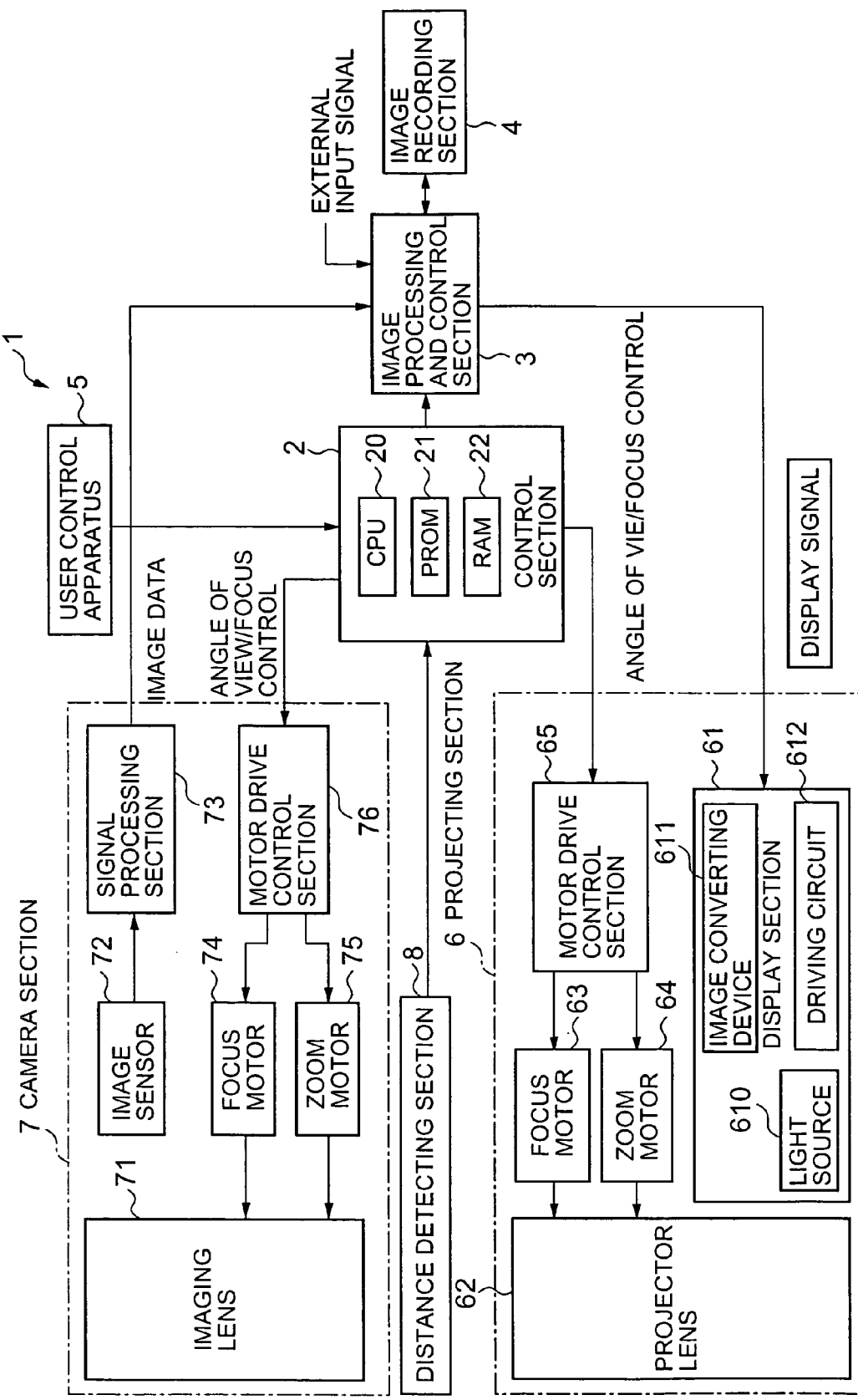
FIG. 1 is a block diagram illustrating a schematic configuration of a projector according to a first embodiment of the present invention.

FIG. 1 is a block diagram illustrating a schematic configuration of a projector 1 according to a first embodiment of the present invention. The projector 1 is one that has a function of shooting a screen on which an image is projected, and includes a control section 2, an image processing and controlling section 3, an image recording section 4, a user control apparatus 5, a projecting section 6, a camera section 7, and a distance detecting section 8.

The control section 2 includes a CPU 20, a program ROM 21 (PROM 21), a RAM 22, and a peripheral circuit (not shown) having an I/O (input-output) interface. Then, the control section 2 controls the respective components of the projector 1 based on a program stored in the program ROM 21 to function as a control section of the present invention.

The program ROM 21 stores a zoom ratio setting table representing an optimal zoom ratio of an imaging lens 71 that corresponds to a zoom ratio of a projector lens 62 and a distance up to the screen (projection distance, subject distance). The program ROM 21 stores a focus setting table representing relationship among projection distance or subject distance, zoom ratio, and an optimal position of a focus lens regarding optical systems of the respective projector lens 62 and imaging lens 71.

The image processing and controlling section 3 generates an image file recorded on the image recording section 4 and a display signal based on document data for presentation. The image processing and controlling section 3 also generates a display signal based on an external input signal input from an external equipment connected to the projector 1, and sends it to the projecting section 6. Additionally, the external input signal refers to an image signal of a projection document (character, diagram, etc.), and a video signal thereof that are sent from, for example, a personal computer, and an input signal of a character and a line drawing sent from a tablet. Moreover, when a shooting operation is executed by the user, the image processing and controlling section 3 generates an image file based on image data sent from the camera section 7 and records it on the image recording section 4.

The image recording section 4 is constituted by, for example, a flash memory built in the projector 1, a memory card that is attachable/detachable to/from the projector 1, or the like.

The user control apparatus 5 includes various kinds of operational keys, which are used when a user executes an operation of the projector 1, for example, a change in an image to be projected (projection image) on the screen, an adjustment of an angle of view of the projection image and a focus adjustment, and a receiving circuit for receiving an infrared signal emitted by an infrared remote controller. Then, the user control apparatus 5 sends an operation signal to the control section 2 in accordance with the operations of the operational keys and the infrared remote controller.

The projecting section 6 includes a display section 61, a projector lens 62 (projection optical section of the present invention), a focus motor 63, a zoom motor 64, and a motor drive control section 65. The display section 61 includes a light source 610 such as a krypton lamp, an image converting device 611 (image converting section of the present invention) such as a liquid crystal, a micromirror array and the like that are used to convert light of the light source to a projection light, and a driving circuit 612 that drives the image converting section. The display section 61 outputs a projection light according to the display signal sent from the image processing and controlling section 3. A screen is irradiated with the projection light output from the display section 61 via the projector lens 62, so that the document and the image are projected and displayed on the screen.

The projector lens 62 includes a multiple optical lenses that form a focus lens and a zoom lens that are movable in a direction of an optical axis. The focus lens is moved by a driving mechanism using the focus motor 63 as an actuator and the zoom lens is moved by a driving mechanism using the zoom motor 64 as an actuator. Furthermore, the focus motor 63 and the zoom motor 64 are individually driven by the motor drive control section 65 based on an angle-of-view control signal and a focus control signal sent from the control section 2 to function as a projection-side driving section of the present invention together with the motor drive control section 65.

The camera section 7 includes an imaging lens 71 (imaging optical section of the present invention), an image sensor 72 (imaging section of the present invention), a signal processing section 73, a focus motor 74, a zoom motor 75, and a motor drive control section 76. The image sensor 72 is, for example, a CCD or CMOS type solid state image sensor. When a shooting operation is executed by the user, the image sensor 72 converts an optical image of a subject image-formed by the imaging lens 71 to an imaging signal by photoelectric conversion, and outputs the converted signal. The signal processing section 73 removes noise from an output signal of the image sensor 72 and converts the signal to a digital signal and outputs the converted signal to the image processing and controlling section 3. Additionally, though this is not illustrated, a driving circuit that drives the image sensor 72 is included in the camera section 7.

The imaging les 71 includes a multiple optical lenses that form a focus lens and a zoom lens that are movable in a direction of an optical axis. The focus lens is moved by a driving mechanism using the focus motor 74 as an actuator and the zoom lens is moved by a driving mechanism using the zoom motor 75 as an actuator. Furthermore, the focus motor 74 and the zoom motor 75 are individually driven by the motor drive control section 76 based on an angle-of-view control signal and a focus control signal sent from the control section 2 to function as an imaging-side driving section of the present invention together with the motor drive control section 76.

The distance detecting section 8 is a distance information obtaining section of the present invention and includes an infrared generating device and a pair of light receiving sensors. The distance detecting section 8 emits an infrared light and receives the reflected light to detect a distance up to the screen (projection distance, subject distance) by the principle of triangulation and output the detection result to the control section 2.

Then, in the projector 1, the projector lens 62 and the imaging lens 71 are arranged in such a way that an image projecting direction is substantially the same as an image shooting direction when the distance from the screen is within a predetermined range.

Figure 2:
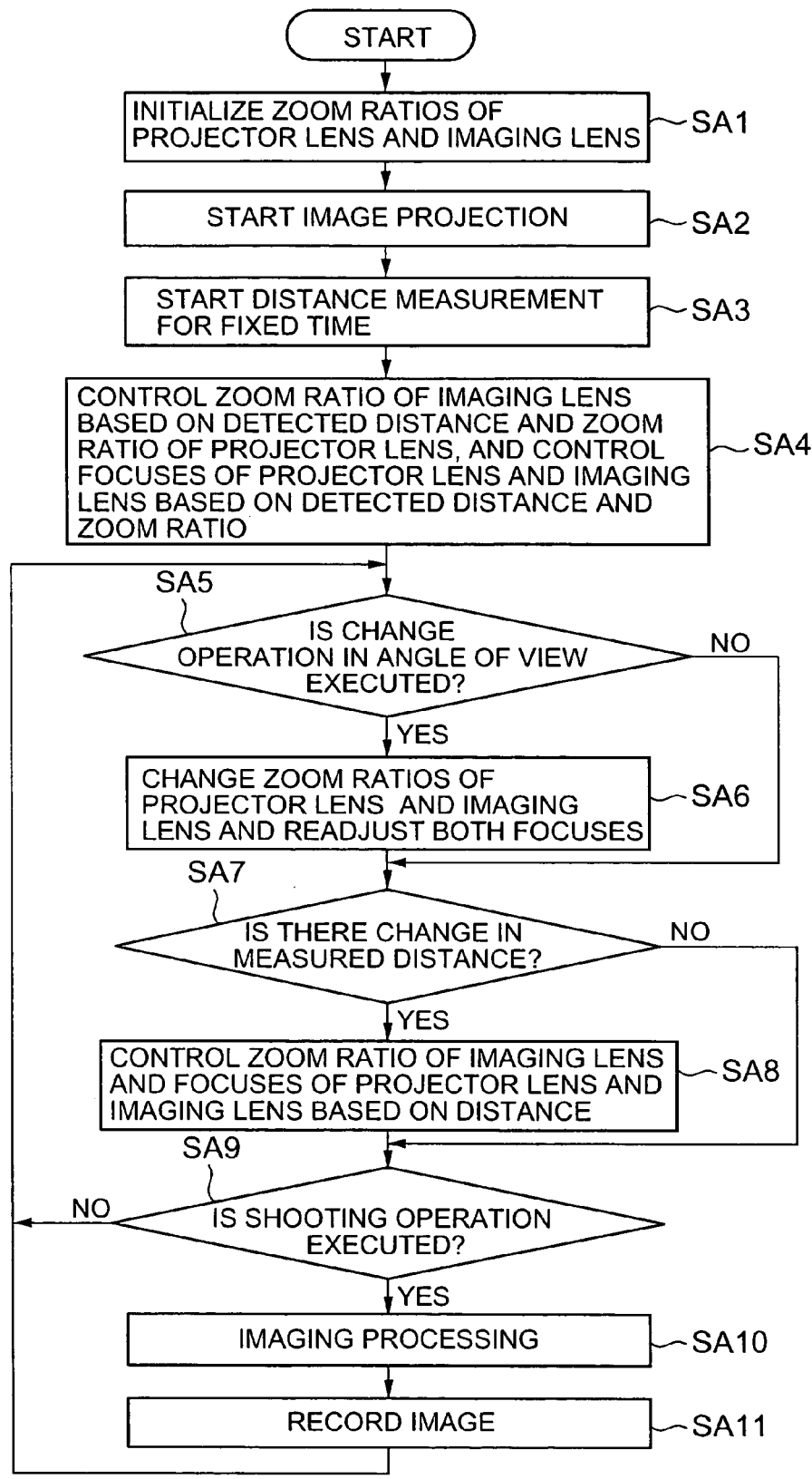

An explanation will be next given of an operation of the above-configured projector 1 according to the present invention. FIG. 2 is a flowchart illustrating an operation of the projector 1 after power is turned on.

When the projector starts an operation upon power-on, the control section 2 drives the projector lens 62 and the imaging lens 71 to initialize each zoom ratio to a predetermined zoom ratio such as 1:1 (step SA1), and then starts to project the document, the image, and the like (step SA2). Furthermore, the control section 2 starts an operation for detecting a distance (projection distance, subject distance) up to the screen with a predetermined interval (step SA3). Additionally, the detected distance is stored to RAM of the control section 2 each time.

Sequentially, the control section 2 controls a zoom ratio of the imaging lens 71 to a predetermined value based on the distance detected in step SA3 and the initialized zoom ratio of the projector lens 62, thereby ensuring a state that an entire area of the image imaged by the image sensor 72 is occupied by the image projected on the screen. At the same time, the control section 2 controls a focus of the projector lens 62 based on the detected distance and the initialized zoom ratio, and controls a focus of the imaging lens 71 based on the detected distance and to the zoom ratio obtained after the aforementioned control was executed. Namely, the control section 2 brings an image in projection into focus, and at the same time, brings the image to be imaged afterward into focus in advance (step SA4).

The aforementioned control of the zoom ratio of the imaging lens 71 is performed based on the aforementioned zoom ratio setting table. Moreover, position adjustments of both focus lenses of the projector lens 62 and the imaging lens 71 are individually decided based on the aforementioned focus setting table.

Afterward, when a change operation in angle of view is executed by the user (YES in step SA5), the control section 2 drives the zoom lens of the projector lens 62 to change the zoom ratio according to the operation, and readjusts the focus according to the changed zoom ratio. At the same time, the control section 2 controls the position of the zoom lens of the imaging lens 71 in such a way that the zoom ratio is adjusted to the projector lens 62, and readjusts the focus according to the changed zoom ratio (step SA6). Moreover, when the projector 1 is moved at any time and a change in the distance detected by the distance detecting section 8 occurs (YES in step SA7), the control section 2 readjusts the zoom ratio of the imaging lens 71 and the focuses of the projector lens 62 and the imaging lens 71 according to the changed distance (step SA8).

Then, when a shooting operation is executed by the user (YES in step SA9), imaging processing is executed using a screen on which a document, an image and the like are projected as a subject by the camera section 7 (step SA10) and the imaged image is recorded onto the image recording section 4 (strep SA11). Afterward, the processing flow goes back to step SA5 and the aforementioned operation is repeated until power is turned off.

As mentioned above, according to the present embodiment, both focus positions of the projector lens 62 and the imaging lens 71 are automatically controlled to positions according to the distance up to the screen. Also, when a change operation in angle of view is executed by the user, the zoom ratio of the imaging lens 71 is controlled to a zoom ratio, which is synchronized with the zoom ratio of the projector lens 62 and corresponds to the zoom ratio of the projector lens 62. Accordingly, at the time of shooting the screen on which the image is projected, there is no need to perform the work for individually changing and adjusting the zoom ratio and the focus of the imaging lens 71. This makes it possible to improve the usability and facilitate the work for shooting the screen on which the image is projected.

Additionally, in the above embodiment, the focus control of the imaging lens 71 is performed concurrently with the projector lens 62, and the zoom ratio is constantly controlled to the value corresponding to the zoom ratio of the projector lens 62. However, the following processing may be possible. For example, the zoom ratio and focus of the imaging lens 71 may be controlled immediately before the imaging operation only when the shooting operation is executed by the user. Furthermore, the focus control of the projector lens 62 and the imaging lens 71 except the readjustment with the change in the zoom ratio may be performed only immediately after power is turned on.

Second Embodiment

Figure 3:
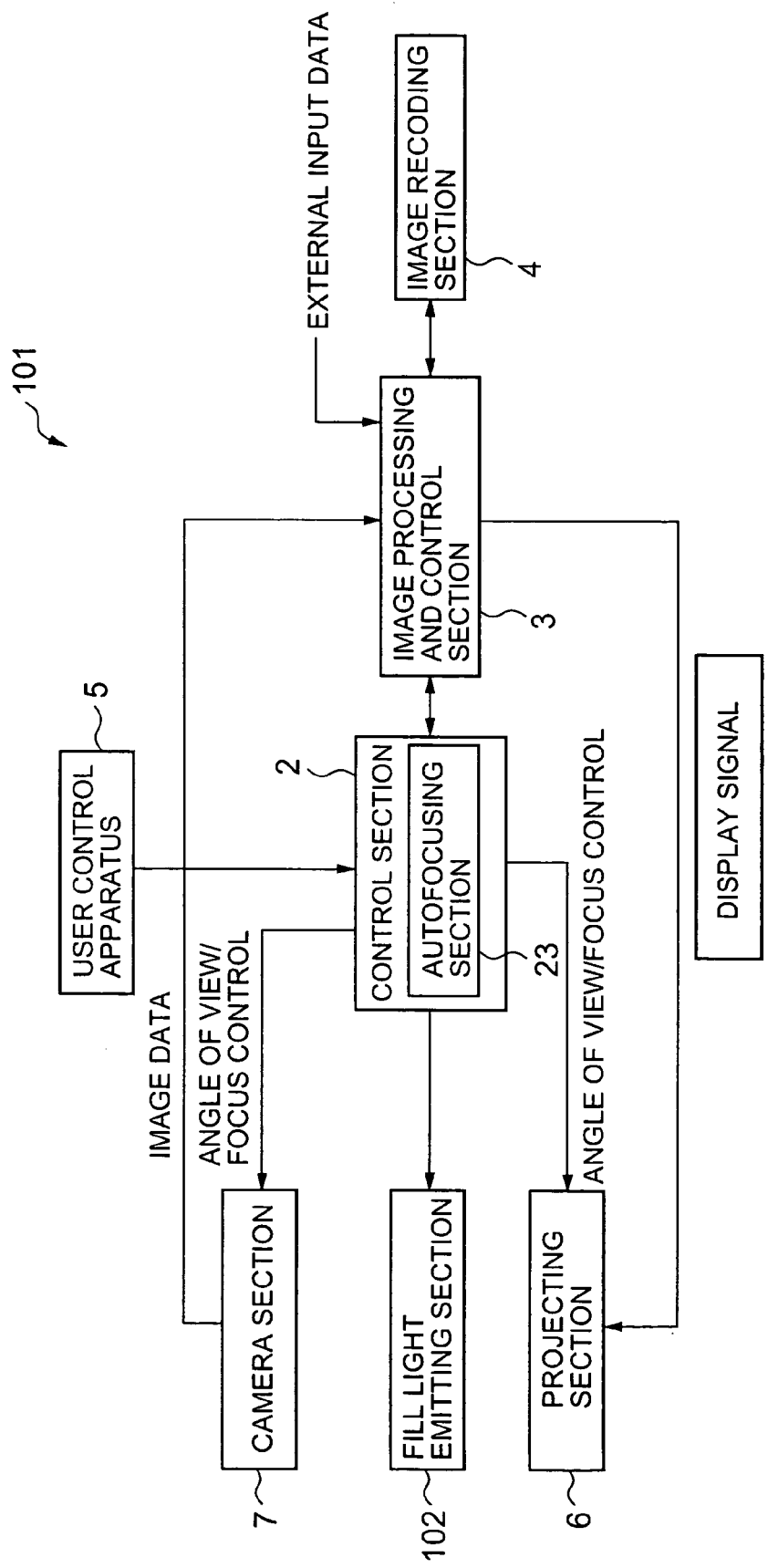
FIG. 3 is a block diagram illustrating a schematic configuration of a projector according to a second embodiment of the present invention.

A second embodiment of the present invention will be next explained. FIG. 3 is a block diagram illustrating a schematic configuration of a projector 101 according to this embodiment.

In the projector 101, the aforementioned distance detecting section 8 is disused, while a fill light emitting section 102 is provided. The fill light emitting section 102 includes a light source for white light, red light, and the like and its driving circuit, and emits a fill light for imaging as required. Moreover, in this embodiment, the control 2 functions as an autofocusing section 23 of the present invention and the other components are the same as those of FIG. 1 and the same reference numerals are added to the same parts as those of FIG. 1, and the explanation is omitted.

Figure 4:
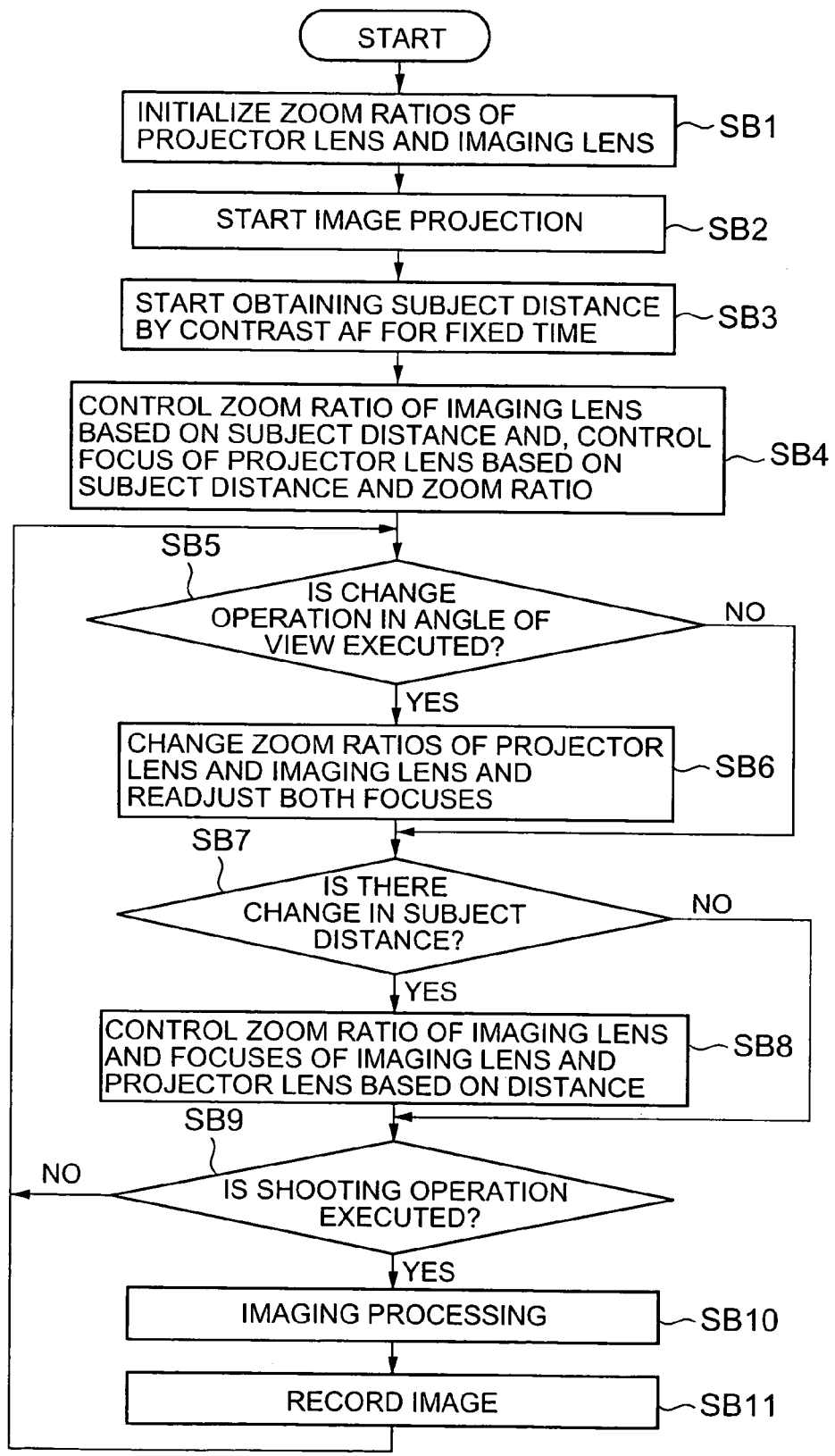

FIG. 4 is a flowchart illustrating an operation of the projector 101 after power is turned on. When the projector 101 starts an operation upon power-on, the control section 2 drives the projector lens 62 and the imaging lens 71 to initialize each zoom ratio (step SB1), and then starts projecting a document, an image, and the like (step SB2).

Furthermore, the control section 2 executes contrast AF every predetermined time to start an operation for obtaining a subject distance (step SB3). Namely, focus control of the imaging lens 71 of the camera section 7 is performed by the known contrast AF system, and an operation for obtaining a subject distance is started from the zoom ratio and the position of the focus lens of the imaging lens 71 subjected to focus control using the focus setting table for imaging lens 71. Additionally, the detected distance is stored to RAM of the control section 2 each time. Then, the obtained distance is used as the projection distance, and the zoom ratio of the imaging lens 71 is controlled using the aforementioned zoom ratio setting table and the focus of the projector lens 62 is controlled using the focus setting table for projector lens 62 (step SB4).

The following operations in steps SB5 to SB11 are the same as those explained in steps SA5 to SA11 shown in FIG. 2.

As mentioned above, in the projector 101 of this embodiment, the focus position of the imaging lens 71 is automatically controlled and the focus position of the projector lens 62 is automatically controlled in synchronization with the focus position of the imaging lens 71. Additionally, similar to the first embodiment, when a change operation in angle of view is executed by the user, the zoom ratio of the imaging lens 71 is controlled to the zoom ratio, which is synchronized with the zoom ratio of the projector lens 62 and corresponds to the zoom ratio of the projector lens 62. Therefore, also, in this embodiment, at the time of shooting the screen on which the image is projected, there is also no need to perform the work for individually changing and adjusting the zoom ratio and the focus of the imaging lens 71. This makes it possible to improve the usability and facilitate the work for shooting the screen on which the image is projected.

Also, in this embodiment, in this embodiment, the zoom ratio of the imaging lens 71 may be controlled immediately before the imaging operation only when the shooting operation is executed by the user. Furthermore, the focus control of the projector lens 62 and the imaging lens 71 except the adjustment with the change in the zoom ratio may be performed just after power is turned on.

Third Embodiment

Figure 5:
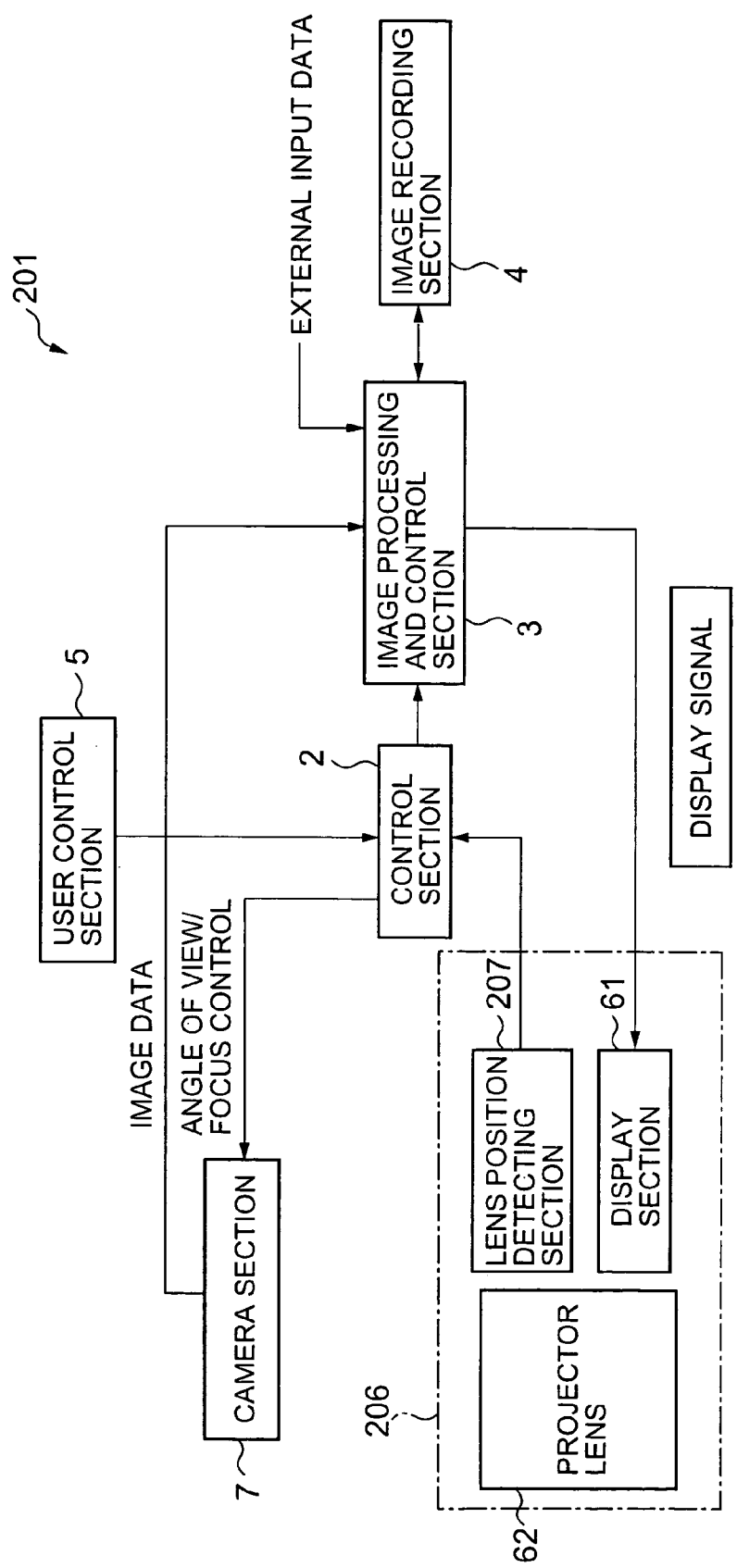
FIG. 5 is a block diagram illustrating a schematic configuration of a projector according to a third embodiment of the present invention.

A third embodiment of the present invention will be next explained. FIG. 5 is a block diagram illustrating a schematic configuration of a projector 201 according to this embodiment.

The projector 201 includes a projecting section 206 having a display section 61, a projector lens 62 and a lens position detecting section 207 unlike the aforementioned projectors 1 and 101. The display section 61 is the same as that previously explained, and the projector lens 62 is also the same as that previous explained except the point that the change in zoom ratio and focus adjustment are manually executed. The lens position detecting section 207 includes a position sensor that detects each lens position of the projector lens 62 moved by the manual operation, and sends a position detection signal indicating each position to the control section 2. Additionally, regarding the other configuration, the same reference numerals are added to the same parts as those of FIGS. 1 and 2 and the explanation is omitted.

Figure 6:
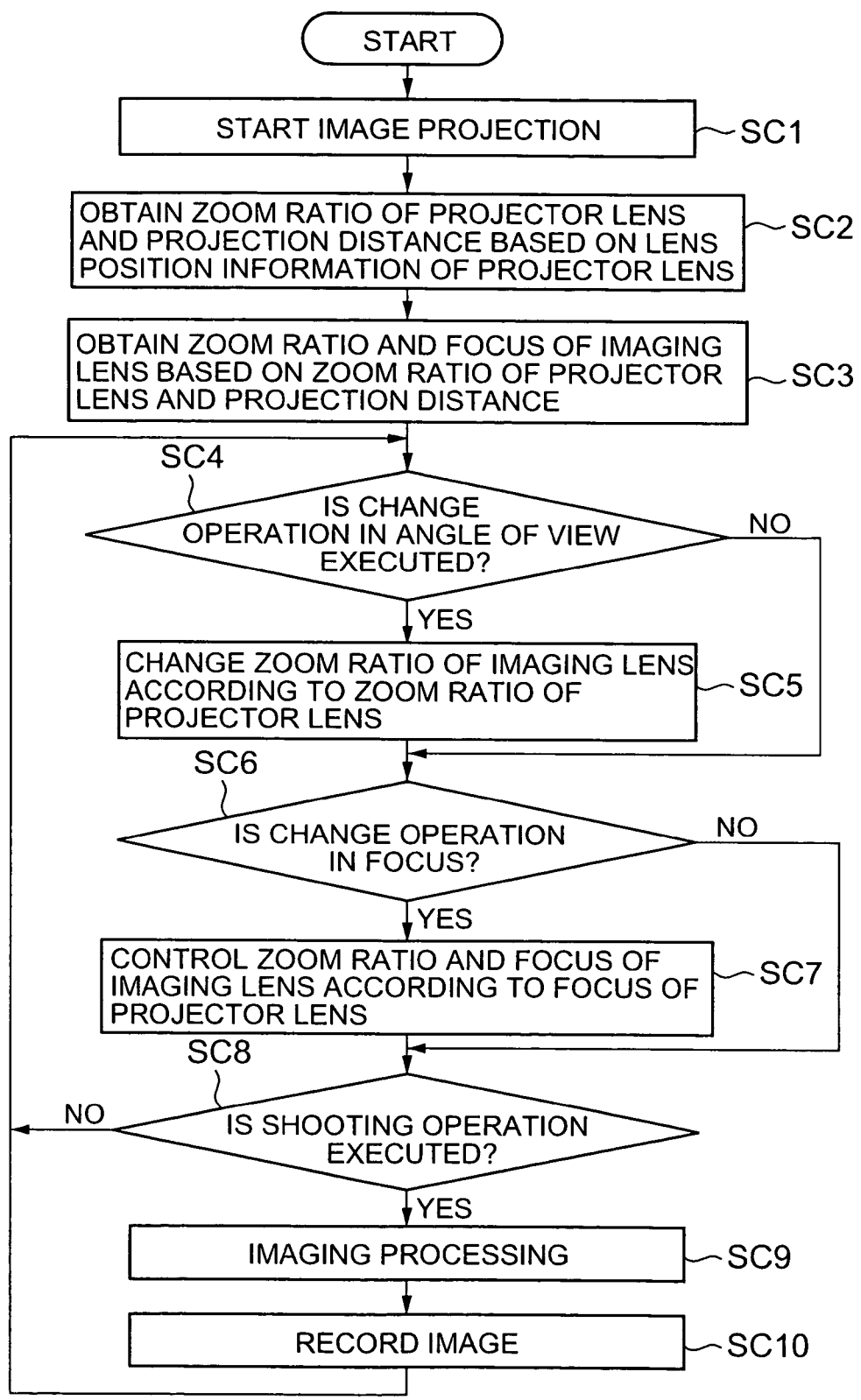

FIG. 6 is a flowchart illustrating an operation of the projector 201 after power is turned on. When the projector 201 starts an operation upon power-on, the control section 2 first starts projecting a document, an image and the like (step SC1). Next, the control section 2 obtains a zoom ratio of the projector lens 62 and a projection distance based on lens position information detected by the lens position detecting section 207 (step SC2). Additionally, in order to obtain the zoom ratio and the projection distance, the aforementioned focus setting table for projector lens 62 is used. Sequentially, the control section 2 controls a zoom ratio of the imaging lens 71 to a zoom ratio corresponding to the zoom ratio of the projector lens 62 by using the aforementioned zoom ratio setting table based on the obtained zoom ratio and projection distance, and controls a focus of the imaging lens 71 by regarding the projection distance as a subject distance, and using the aforementioned focus setting table (step SC3).

Afterward, when the zoom ratio and the focus of the projector lens 62 are manually operated by the user, the control section 2 controls the zoom ratio and the focus of the imaging lens 71 to be adjusted to the projector lens 62 by the same method as the above (steps SC4 to SC7). Moreover, when the shooting operation is executed by the user (YES in step SC8), the control section 2 images the screen on which the document, the image and the like are projected and records the imaged image onto the image recording section 4 (steps SC9 and SC10). Afterward, the processing flow goes back to step SC4 and the aforementioned operation is repeated until power is turned off.

As mentioned above, in the projector 201 of the present embodiment, when the zoom ratio and the focus position of the projector lens 62 are set by the user, the zoom ratio of the imaging lens 71 is controlled to the zoom ratio, which is synchronized with the zoom ratio of the projector lens 62 and corresponds to the zoom ratio of the projector lens 62, and the focus position is automatically controlled. Therefore, also, in this embodiment, at the time of shooting the screen on which the image is projected, there is no need to perform the work for individually changing and adjusting the zoom ratio and the focus of the imaging lens 71. This makes it possible to improve the usability and facilitate the work for shooting the screen on which the image is projected.

Additionally, in the aforementioned first to third embodiments, the explanation is given of the imaging lens 71, which is focus controllable. However, for example, in the configuration in which the focus position of the imaging lens 71 is fixed such as the use of the imaging lens 71 having a high depth of field, the zoom ratio of the imaging lens 71 is only synchronized with the zoom ratio of the projector lens 62, thereby making it possible to eliminate the need for the preparatory work prior to the use of a shooting function and improve the usability.

Fourth Embodiment

Figure 7:
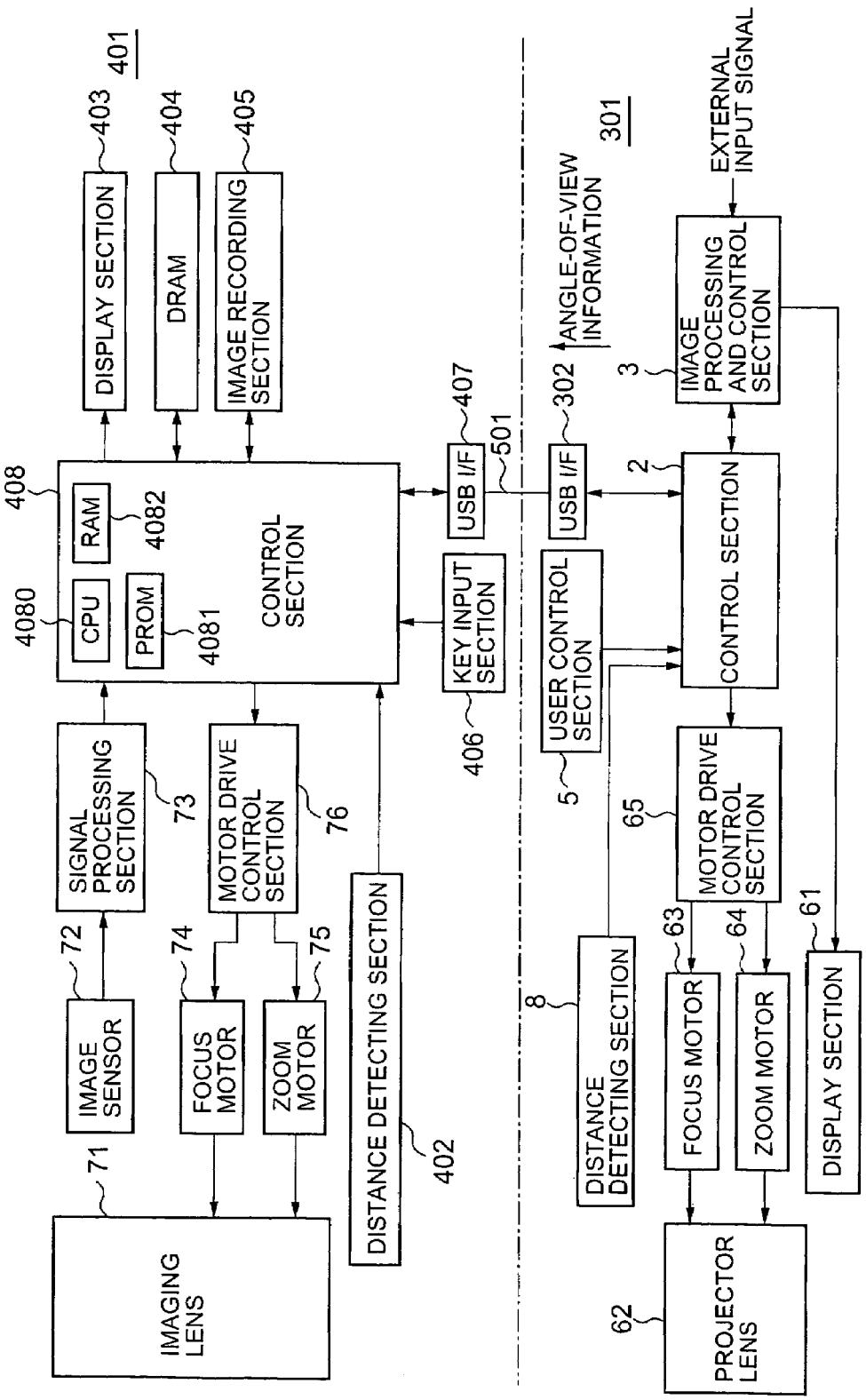
FIG. 7 is a block diagram illustrating a schematic configuration of a projection image shooting system according to a fourth embodiment of the present invention.

A fourth embodiment of the present invention will be next explained. FIG. 7 is a block diagram illustrating a schematic configuration of a projection image shooting system according to the present invention. The projection image shooting system of this embodiment includes a projector 301 and a digital camera 401 that are connected to each other via a USB cable 501.

First of all, the configuration of the projector 301 is explained. The projector 301 is an image projecting apparatus of the present invention, and includes a control section 2, an image processing and controlling section 3, an image recording section 4, a user control apparatus 5, a distance detecting section 8, a display section 61, a projector lens 62, a focus motor 63, a zoom motor 64, and a motor drive control section 65, similar to the projector 1 illustrated in FIG. 1 as the first embodiment. The respective components have the same functions as those of FIG. 1, and the projector 301 can also execute a change operation in the zoom ratio of the projector 62 and automatically control the focus of the screen-projected image based on the detected distance of the distance detecting section 8.

Moreover, the projector 301 has a USB interface 302, which is a transmitting section of the present invention, thereby making it possible to perform data communications with the digital camera 401. Furthermore, in a program ROM 21 (not shown) that configures the control section 2, a program for causing the projector 301 to execute an operation to be described later is stored.

On the other hand, the digital camera 401 is an imaging apparatus of the present invention, and includes an imaging lens 71, an image sensor 72, a signal processing section 73, a focus motor 74, a zoom motor 75, and a motor drive control section 76, which have the same functions as those provided in the camera section 7 of the projector 1 shown in FIG. 1 as the first embodiment. Additionally, in FIG. 7, a driving circuit that drives the image sensor 72 is also omitted.

Moreover, the digital camera 401 includes an AF function and has a distance detecting section 402 that detects a subject distance by the same system that is provided in the projector 301. Furthermore, the digital camera 401 has a display section 403, a DRAM 404, an image recording section 405, a key input section 406, a USB interface 407, which is a receiving section of the present invention, and a control section 408, which controls the entire operation of the digital camera 401, similar to the general camera.

The image recording section 405 is a nonvolatile memory that records an image imaged by the image sensor 72, and constituted by, for example, a flash memory that is built in the main body of the camera or attachable/detachable to/from the main body of the camera. The display section 403 is constituted by a liquid crystal monitor, which displays the image imaged by the image sensor 72 and the image recorded on the image recording section 405, and its driving circuit. The DRAM 404 is used as a work memory mainly when the control section 408 performs compression/decompression of the image imaged by the image sensor 72.

The key input section 406 includes a power key, a shutter key, and a mode change key for allowing the user to perform various kinds of setting operations. Additionally, in the digital camera 401, there is prepared a synch shooting mode for shooting the image that is projected on the screen by the projector 301, in addition to a general recording (shooting) mode that records the image imaged when the shutter key is depressed while displaying a through image on the display section 403.

The control section 408 includes a CPU 4080, a program ROM 4081 (PROM 4081), a RAM 4082, and a peripheral circuit having an I/O (input-output) interface (not shown). Then, control of each component and compression/decompression of the image are executed based on a program stored in the program ROM 4081, while the digital camera 401 is caused to perform an operation to be described later to function as a control section of the present invention. Moreover, in the program ROM 4081 of the control section 408, there is stored a zoom ratio setting table indicating an optimal zoom ratio corresponding to the relationship between the zoom ratio of the projector lens 62 and the distance up to the screen (projection distance, subject distance) that the projector 301 has.

Figure 8:
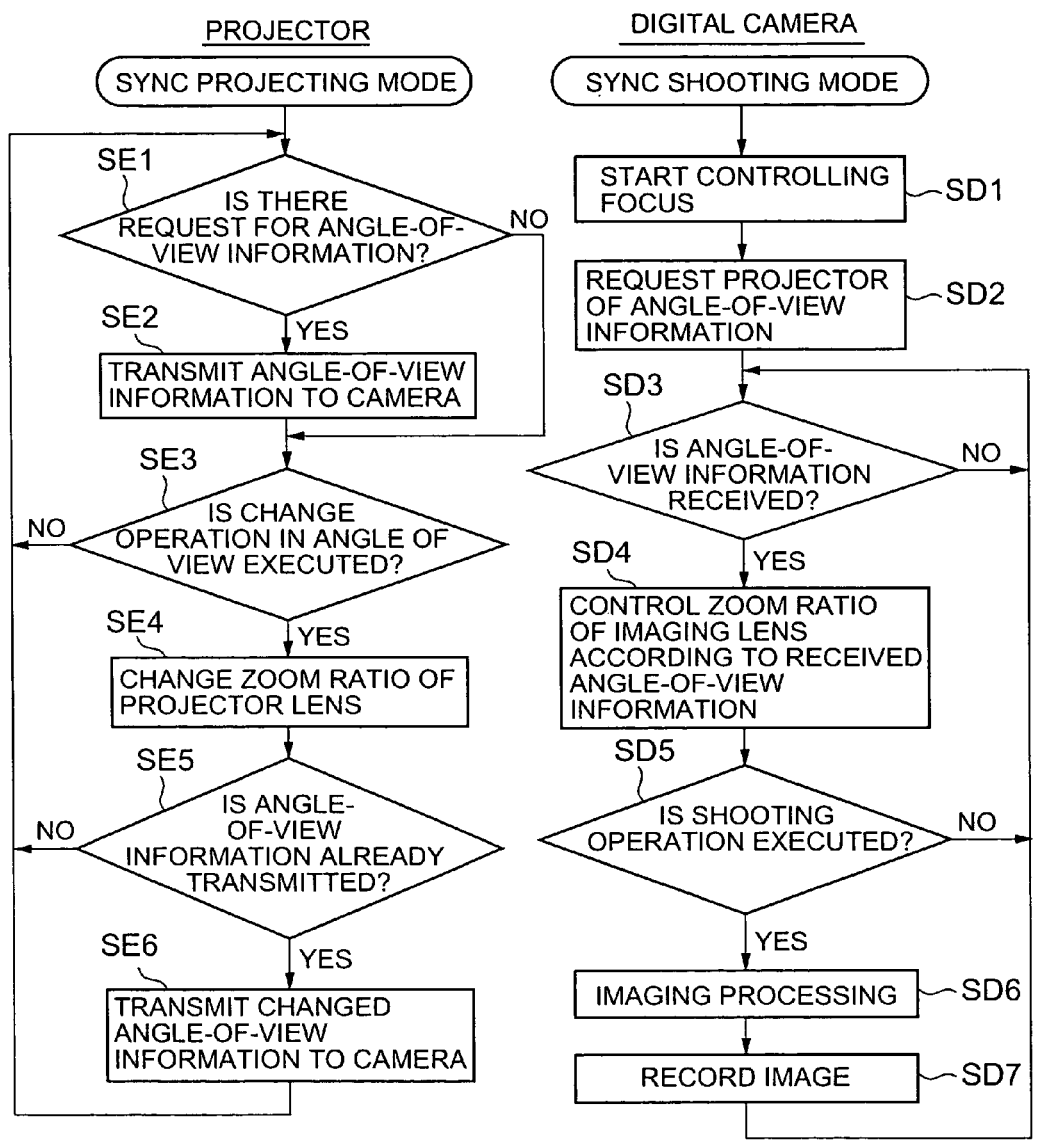
FIG. 8 is a flowchart illustrating an operation of a projector in a sync projecting mode and an operation of a digital camera in a sync shooting mode in the projection image shooting system shown in FIG. 7.

An explanation will be next given of an operation according to the invention in a state that both the above-configured projector 301 and digital camera 401 are connected to each other by the USB cable 501 with reference to FIG. 8.

FIG. 8 is a flowchart illustrating an operation when projection is executed in a sync projecting mode by the projector 301 and an operation when a sync shooting mode is set by the digital camera 401. Additionally, the sync projecting mode of the projector 301 is a mode, which is automatically set when the digital camera 401 is connected thereto at the time when power is turned on or the digital camera 401 is connected thereto at an arbitrary time after power is turned on. Moreover, the sync shooting mode of the digital camera 401 is a shooting operation mode which is settable, for example, only when the digital camera 401 is connected to the projector 301, and is set with a user's mode setting operation.

The control section 408 of the digital camera 401 starts focus control according to a subject distance detected by the distance detecting section 402 with setting of the sync shooting mode (step SD1), and then requests the projector 301 to transmit angle-of-view information (step SD2). Additionally, angle-of-view information is information of a zoom ratio that is stored after being updated by the control section 2 every time when an operation in angle of view is executed by the user.

At this time, the control section 2 of the projector 301 in the sync projecting mode projects an image with an arbitrary zoom ratio set by the user's operation from the user control apparatus 5, and automatically controls a focus by an AF function that the projector 301 possesses. Then, when a transmission request for angle-of-view information is sent from the digital camera 401 (YES in step SE1), the control section 2 transmits the zoom ratio obtained at this time to the digital camera 401 as angle-of-view information (step SE2).

Furthermore, when the operation in angle of view is executed by the user regardless of the presence or absence of the transmission request for angle-of-view information (YES in step SE3), the control section 2 of the projector 301 drives the zoom lens of the projector lens 62 to change the zoom ratio accordingly, and stores angle-of-view information changed according to the change of the zoom ratio (step SE4). In this case, if the angle-of-view information is already sent to the digital camera 401 according to the transmission request (YES in step SE5), the control section 2 transmits the changed angle-of-view information to the digital camera 401 (step SE6). Moreover, if the angle-of-view information is not yet sent to the digital camera 401 (NO in step SE5), the processing flow directly goes back to step SE1 and the aforementioned processing is repeated. Namely, after the angle-of-view information is once transmitted in accordance with the transmission request from the digital camera 401, the control section 2 automatically transmits a changed zoom ratio to the digital camera 401 every time when a change operation in angle of view is executed.

While, when receiving the angle-of-view information (YES in step SD3), the control section 408 of the digital camera 401 drives the zoom lens of the imaging lens 71 according to the received angle-of-view information to control the zoom ratio to a zoom ratio at which almost the entire surface of the screen to be imaged is occupied by the projection image (step SD4). Additionally, the relevant control is performed based on the aforementioned zoom setting table.

Afterward, the digital camera 401 enters the wait state of a shooting operation by a user, and if no shooting operation is executed (NO in step SD5), the control section 408 goes back to step SD3. Then, during the wait state of the shooting operation, every time when angle-of-view information is received from the projector 301, the control section 408 changes the zoom ratio of the imaging lens 71 according to the reception of angle-of-view information. When an operation in angle of view is executed by the user some time later (YES in step SD5), the control section 408 executes imaging processing using a screen on which a document, an image and the like are projected as a subject (step SD6), and records the imaged image on the image recording section 405 (step SD7). Afterward, the processing flow goes back to step SD3 and the aforementioned operation is repeated until the sync shooting mode is released.

As mentioned above, in the projection image shooting system of this embodiment, when the user adjusts the angle of view of the projector 301, the angle of view of the digital camera 401 is automatically controlled to an optimal angle of view corresponding to the angle of view of the projector 301 in synchronization with the adjustment of the angle of view of the projector 301.

Accordingly, the shooting direction (direction of an optical axis of the imaging lens 71) is substantially adjusted to the projection direction (optical axis of the projector lens 62) of the projector 301 in advance as confirming the through image displayed on the display section 403 after setting the general recording mode to the digital camera 401. This eliminates the need for performing the work for individually changing and adjusting the zoom ratio of the imaging lens 71 of the digital camera 401 at the time of shooting the screen on which the image is projected afterward. Accordingly, it is possible to improve the usability and facilitate the work for shooting the screen on which the image is projected.

Additionally, in this embodiment, the explanation is given of the case in which the projector 301 had the distance detecting section 8 and the AF function of controlling the focus of the projector lens 62 based on the distance uniquely detected by the distance detecting section. However, the following configuration may be possible. For example, when the distance detecting section 8 of the projector 301 is disused and only a manual focus adjustment (including an adjustment by an key operation) is generally executed, the digital camera 401 is connected to the projector 301, and the aforementioned sync projecting mode is set, the control section 2 may execute focus control based on distance information received from the digital camera 401.

Moreover, in this embodiment, transmission and reception of angle-of-view information between the projector 301 and the digital camera 401 is allowed by USB connection. In addition to this, it is possible to use a configuration in which angle-of-view information is transmitted and received by the other communication system in a wire or wireless manner (including infrared communications).

Furthermore, it has been explained that there is prepared in advance in the digital camera 401, the zoom ratio setting table indicating an optimal zoom ratio corresponding to the relationship between the zoom ratio of the projector lens 62 possessed by the projector 301 and the distance up to the screen (projection distance, subject distance). However, for example, data forming a zoom ratio setting table may be obtained from the projector 301 at the time when the aforementioned sync shooting mode is set. In this case, it is, of course, that data corresponding to the model of the digital camera 401 should be prepared in the projector 301. Moreover, it is necessary to prepare multiple kinds of data in the projector 301 in order to allow the digital camera 401 of a different model to be used. Then, model information is received from the digital camera 401 in advance, so that data of the corresponding model may be transmitted to the digital camera 401.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-351429 filed on Oct. 10, 2003 and including specification, claims, drawings and summary. The disclosure of the above Japanese Patent Application is incorporated herein by reference in its entirety.

What is claimed is:

1. A projecting apparatus with a shooting function, comprising:
    a projecting section that projects a projection light representing an image onto a screen;
    a camera section that shoots the screen on which the projection light is projected;
    an image converting section that converts image information to the projection light;
    a position adjustable projection optical section that projects the projection light converted by the image converting section onto the screen;
    an imaging section that images the image represented by the projection light projected on the screen that is shot by the camera section;
    a position adjustable imaging optical section that image-forms an optical image imaged by the imaging section; and
    a control section which stores data associated with a position of the projection optical section in a direction of an optical axis thereof and corresponding data associated with a position of the imaging optical section in a direction of an optical axis thereof, and which controls a position of the imaging optical section in synchronization with a position of the projection optical section based on the stored data.

2. The projecting apparatus with a shooting function according to claim 1, further comprising:
    an imaging-side driving section that drives the imaging optical section,
    wherein the control section causes the imaging-side driving section to drive the position of the imaging optical section to a position corresponding to an adjusted position of the projection optical section, so as to control a zoom ratio of the imaging optical section to be a zoom ratio corresponding to a zoom ratio of the projection optical section.

3. The projecting apparatus with a shooting function according to claim 2, further comprising:
    a position information detecting section that detects position information indicating the adjusted position of the projection optical section,
    wherein the control section causes the imaging-side driving section to drive the position of the imaging optical section to a position corresponding to the adjusted position of the projection optical section based on the position information detected by the position information detecting section.

4. The projecting apparatus with a shooting function according to claim 3, wherein the control section causes the imaging-side driving section to drive the imaging optical section based on the position information detected by the position information detection section, so as to control a focus position of the imaging optical section.

5. The projecting apparatus with a shooting function according to claim 1, further comprising:
    a projection-side driving section that drives the projection optical section;
    an imaging-side driving section that drives the imaging optical section; and
    a distance information obtaining section that obtains distance information indicating a distance to the screen,
    wherein the control section causes the projection-side driving section to drive the projection optical section and causes the imaging-side driving section to drive the imaging optical section based on the distance information obtained by the distance information obtaining section, so as to control focus positions of the projection optical section and the imaging optical section.

6. The projecting apparatus with a shooting function according to claim 5, further comprising:
a position information detecting section that detects position information indicating an adjusted position of the projection optical section,
wherein the distance information obtaining section obtains the distance information based on the position information detected by the position information detecting section.

7. The projecting apparatus with a shooting function according to claim 1, further comprising:
a projection-side driving section that drives the projection optical section;
an imaging-side driving section that drives the imaging optical section; and
an auto-focusing section that causes the imaging-side driving section to drive the imaging optical section so as to control a focus position of the imaging optical section to be a position where a contrast value of the image imaged by the imaging section reaches a maximum value, and
wherein the control section causes the projection-side driving section to drive the projection optical section based on the focus position of the imaging optical section controlled by the auto-focusing section, so as to control a focus position of the projection optical section.

8. A projecting apparatus comprising:
an image converting section that converts image information to a projection light;
a position adjustable projection optical section that projects the projection light converted by the image converting section onto a screen;
a position adjustable imaging optical section that image-forms an optical image of an image represented on the screen on which the projection light is projected;
a control section which stores data associated with a position of the projection optical section in a direction of an optical axis thereof and corresponding data associated with a position of the imaging optical section in a direction of an optical axis thereof, and which controls a position of the imaging optical section together with a position of the projection optical section based on the stored data, in such a way that the image represented by the projection light projected on the screen is substantially entirely included in the optical image image-formed by the imaging optical section; and
an imaging section that images the optical image image-formed by the imaging optical section.

9. A method of controlling a projecting apparatus including a position adjustable projection optical section that projects a projection light on a screen and a position adjustable imaging optical section that image-forms an optical image of an image represented on the screen on which the projection light is projected, the method comprising:
converting image information to a projection light;
projecting the converted projection light onto the screen;
controlling a position of the imaging optical section together with a position of the projection optical section, based on pre-stored data associated with a position of the projection optical section in a direction of an optical axis thereof and corresponding pre-stored data associated with a position of the imaging optical section in a direction of an optical axis thereof, in such a way that an image represented by the projection light projected on the screen is substantially entirely included in an optical image image-formed by the imaging optical section; and
imaging the image represented by the projection light projected on the screen.

10. A computer readable storage medium having a program that is executable by a computer of a projecting apparatus with a shooting function, the program comprising:
controlling a position of an imaging optical section of the projecting apparatus together with a position of a projection optical selection of the projecting apparatus, based on pre-stored data associated with a position of the projection optical section in a direction of an optical axis thereof and corresponding pre-stored data associated with a position of the imaging optical section in a direction of an optical axis thereof;
wherein an image represented by projection light projected through the projection optical section onto a screen is substantially entirely included in an optical image image-formed by the imaging optical section.

11. A projection image shooting system comprising:
an image projecting section that projects a projection light representing an image onto a screen; and
an imaging section that images the screen on which the projection light is projected,
wherein the image projecting section comprises:
an image converting section that converts image information to the projection light;
a position adjustable projection optical section that projects the projection light converted by the image converting section onto the screen; and
a transmitting section that transmits angle-of-view information indicating a zoom ratio of the projection optical section to the imaging section, and
wherein the imaging section comprises:
an imaging section that images an image represented by the projection light projected on the screen;
a position adjustable imaging optical section that image-forms an optical image to be imaged by the imaging section;
an imaging-side driving section that drives the imaging optical section;
a receiving section that receives the angle-of-view information transmitted from the image projecting section; and
a control section which stores data associated with a position of the projection optical section in a direction of an optical axis thereof and corresponding data associated with a position of the imaging optical section in a direction of an optical axis thereof, and which causes the imaging-side driving section to drive the imaging optical section based on the angle-of-view information received by the receiving section, so as to control a zoom ratio of the imaging optical section to be a zoom ratio corresponding to a zoom ratio of the projection optical section.

12. The projection image shooting system according to claim 11, wherein the image projecting section further comprises:
a projection-side driving section that drives the projection optical section;
a distance information obtaining section that obtains distance information indicating a distance to the screen; and
a control section that causes the projection-side driving section to drive the projection optical section based on the distance information obtained by the distance information obtaining section, so as to control a focus position of the projection optical section, and wherein the control section of the imaging section causes the imaging-side driving section to drive the imaging optical section based on the focus position of the projection optical section, so as to control a focus position of the imaging optical section.

13. The projection image shooting system according to claim 12, wherein when the zoom ratio of the projection optical section is changed, the control section of the image projecting section changes the angle-of-view information and causes the transmitting section to transmit the changed angle-of-view information to the imaging section.

14. A projecting apparatus with a shooting function, comprising:

a projecting section that projects a projection light representing an image onto a screen;

a camera section that shoots the screen on which the projection light is projected;

an image converting section that converts image information to the projection light;

a position adjustable projection optical section that projects the projection light converted by the image converting section onto the screen;

an imaging section that images the image represented by the projection light projected on the screen that is shot by the camera section;

a position adjustable imaging optical section that image-forms an optical image imaged by the imaging section; and a control section which stores data associated with a position of the projection optical section in a direction of an optical axis thereof and corresponding data associated with a position of the imaging optical section in a direction of an optical axis thereof, and which obtains a projection distance corresponding to a pre-adjusted position of the projection optical section or the image optical section based on the stored data and controls a position of the imaging optical section in synchronization with a position of the projection optical section according to the obtained projection distance.

* * * * *